US012682511B1

(12) United States Patent      (10) Patent No.:   US 12,682,511 B1

Andrei et al.      (45) Date of Patent:     Jul. 14, 2026

(54) MACHINE LEARNING SYSTEMS FOR GENERATING OUTPUT IMAGES BASED ON STYLE ELEMENTS OF INPUT IMAGES

(71) Applicant: AMAZON TECHNOLOGIES, INC., Seattle, WA (US)

(72) Inventors: Silviu Stefan Andrei, Kirkland, WA (US); Guanglei Xiong, Pleasanton, CA (US); Tor Hamilton Steiner, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 141 days.

(21) Appl. No.: 18/615,195

(22) Filed: Mar. 25, 2024

(51) Int. Cl.
| | |
|---|---|
| *G06T 11/00* | (2026.01) |
| *G06T 5/70* | (2024.01) |
| *G06T 7/13* | (2017.01) |
| *G06T 9/00* | (2006.01) |

(52) U.S. Cl.
CPC ................ *G06T 11/00* (2013.01); *G06T 5/70* (2024.01); *G06T 7/13* (2017.01); *G06T 9/00* (2013.01)

(58) Field of Classification Search
CPC .............. G06T 11/00; G06T 5/70; G06T 7/13
See application file for complete search history.

(56) References Cited

U.S. PATENT DOCUMENTS

2025/0225627 A1 * 7/2025 Rao ........................... G06T 5/70

* cited by examiner

*Primary Examiner* — Matthew Salvucci

(74) *Attorney, Agent, or Firm* — Lindauer Law, PLLC

(57) ABSTRACT

A diffusion model is provided with a reference image and a text prompt, and generates output images having content specified in the prompt and style characteristics represented in the image. The reference image is encoded to generate multiple image embeddings. The prompt is encoded to generate a text embedding that is separate from the image embeddings. After each denoising step of the diffusion model, the text embedding is used to perform a first cross-attention operation on the denoising output, and the image embeddings are used to perform a second cross-attention operation. During earlier denoising steps, the second cross-attention operation is associated with a low weight parameter, causing the operation to have a smaller effect on the output image. During later denoising steps, a high weight parameter is used. In some cases, the input image for the model may be generated by performing a diffusion process using the reference image.

20 Claims, 5 Drawing Sheets

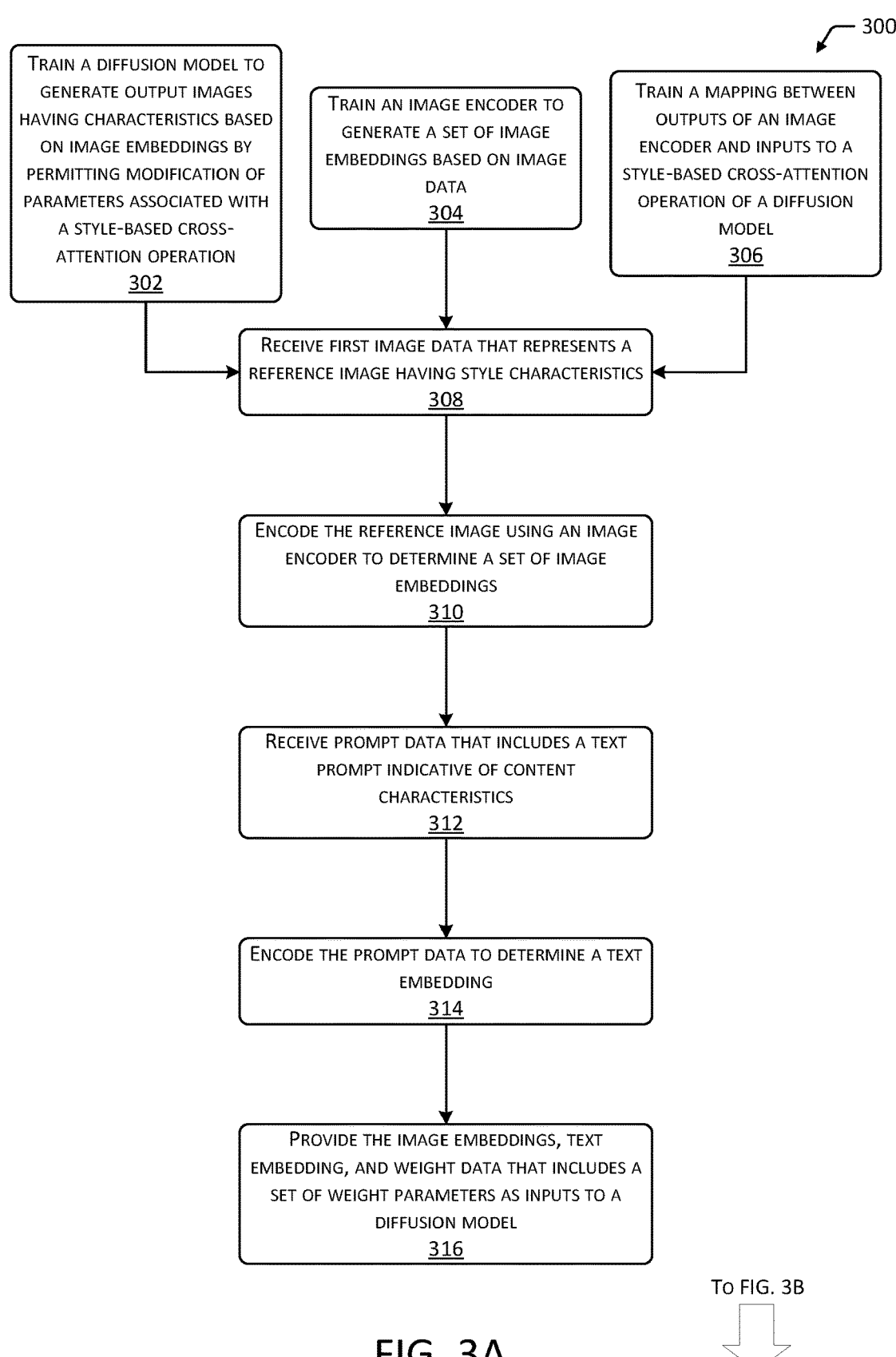

300

TRAIN A DIFFUSION MODEL TO GENERATE OUTPUT IMAGES HAVING CHARACTERISTICS BASED ON IMAGE EMBEDDINGS BY PERMITTING MODIFICATION OF PARAMETERS ASSOCIATED WITH A STYLE-BASED CROSS-ATTENTION OPERATION
302

TRAIN AN IMAGE ENCODER TO GENERATE A SET OF IMAGE EMBEDDINGS BASED ON IMAGE DATA
304

TRAIN A MAPPING BETWEEN OUTPUTS OF AN IMAGE ENCODER AND INPUTS TO A STYLE-BASED CROSS-ATTENTION OPERATION OF A DIFFUSION MODEL
306

RECEIVE FIRST IMAGE DATA THAT REPRESENTS A REFERENCE IMAGE HAVING STYLE CHARACTERISTICS
308

ENCODE THE REFERENCE IMAGE USING AN IMAGE ENCODER TO DETERMINE A SET OF IMAGE EMBEDDINGS
310

RECEIVE PROMPT DATA THAT INCLUDES A TEXT PROMPT INDICATIVE OF CONTENT CHARACTERISTICS
312

ENCODE THE PROMPT DATA TO DETERMINE A TEXT EMBEDDING
314

PROVIDE THE IMAGE EMBEDDINGS, TEXT EMBEDDING, AND WEIGHT DATA THAT INCLUDES A SET OF WEIGHT PARAMETERS AS INPUTS TO A DIFFUSION MODEL
316

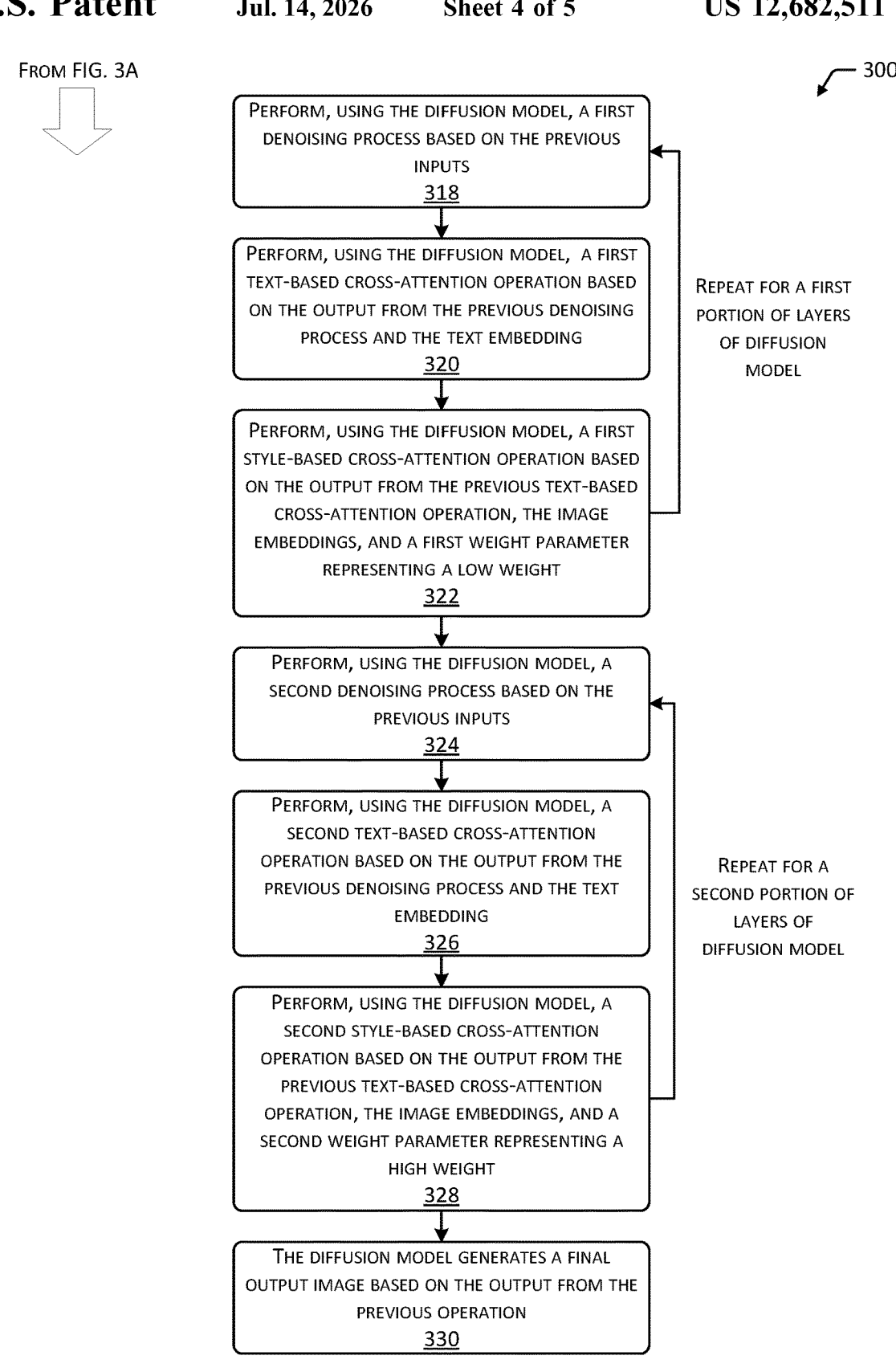

FROM FIG. 3A

300

PERFORM, USING THE DIFFUSION MODEL, A FIRST DENOISING PROCESS BASED ON THE PREVIOUS INPUTS
318

PERFORM, USING THE DIFFUSION MODEL, A FIRST TEXT-BASED CROSS-ATTENTION OPERATION BASED ON THE OUTPUT FROM THE PREVIOUS DENOISING PROCESS AND THE TEXT EMBEDDING
320

PERFORM, USING THE DIFFUSION MODEL, A FIRST STYLE-BASED CROSS-ATTENTION OPERATION BASED ON THE OUTPUT FROM THE PREVIOUS TEXT-BASED CROSS-ATTENTION OPERATION, THE IMAGE EMBEDDINGS, AND A FIRST WEIGHT PARAMETER REPRESENTING A LOW WEIGHT
322

REPEAT FOR A FIRST PORTION OF LAYERS OF DIFFUSION MODEL

PERFORM, USING THE DIFFUSION MODEL, A SECOND DENOISING PROCESS BASED ON THE PREVIOUS INPUTS
324

PERFORM, USING THE DIFFUSION MODEL, A SECOND TEXT-BASED CROSS-ATTENTION OPERATION BASED ON THE OUTPUT FROM THE PREVIOUS DENOISING PROCESS AND THE TEXT EMBEDDING
326

PERFORM, USING THE DIFFUSION MODEL, A SECOND STYLE-BASED CROSS-ATTENTION OPERATION BASED ON THE OUTPUT FROM THE PREVIOUS TEXT-BASED CROSS-ATTENTION OPERATION, THE IMAGE EMBEDDINGS, AND A SECOND WEIGHT PARAMETER REPRESENTING A HIGH WEIGHT
328

REPEAT FOR A SECOND PORTION OF LAYERS OF DIFFUSION MODEL

THE DIFFUSION MODEL GENERATES A FINAL OUTPUT IMAGE BASED ON THE OUTPUT FROM THE PREVIOUS OPERATION
330

FIG. 3B

MACHINE LEARNING SYSTEMS FOR GENERATING OUTPUT IMAGES BASED ON STYLE ELEMENTS OF INPUT IMAGES

BACKGROUND

Various types of machine learning models, such as text-to-image diffusion models, may be used to produce images based on text, and in some cases based on other images. However, the when using a reference image as an input to affect the style or other characteristics of an image produced using a diffusion model, a significant amount of information contained in the reference image may be lost due to the manner in which the reference image is encoded and processed using the diffusion model, resulting in lower fidelity to the style characteristics and other elements of the reference image.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A and 3B are a flow diagram depicting an implementation of a method for using a diffusion model to generate an output image based on embeddings associated with a reference image and a text prompt.

Figure 1:
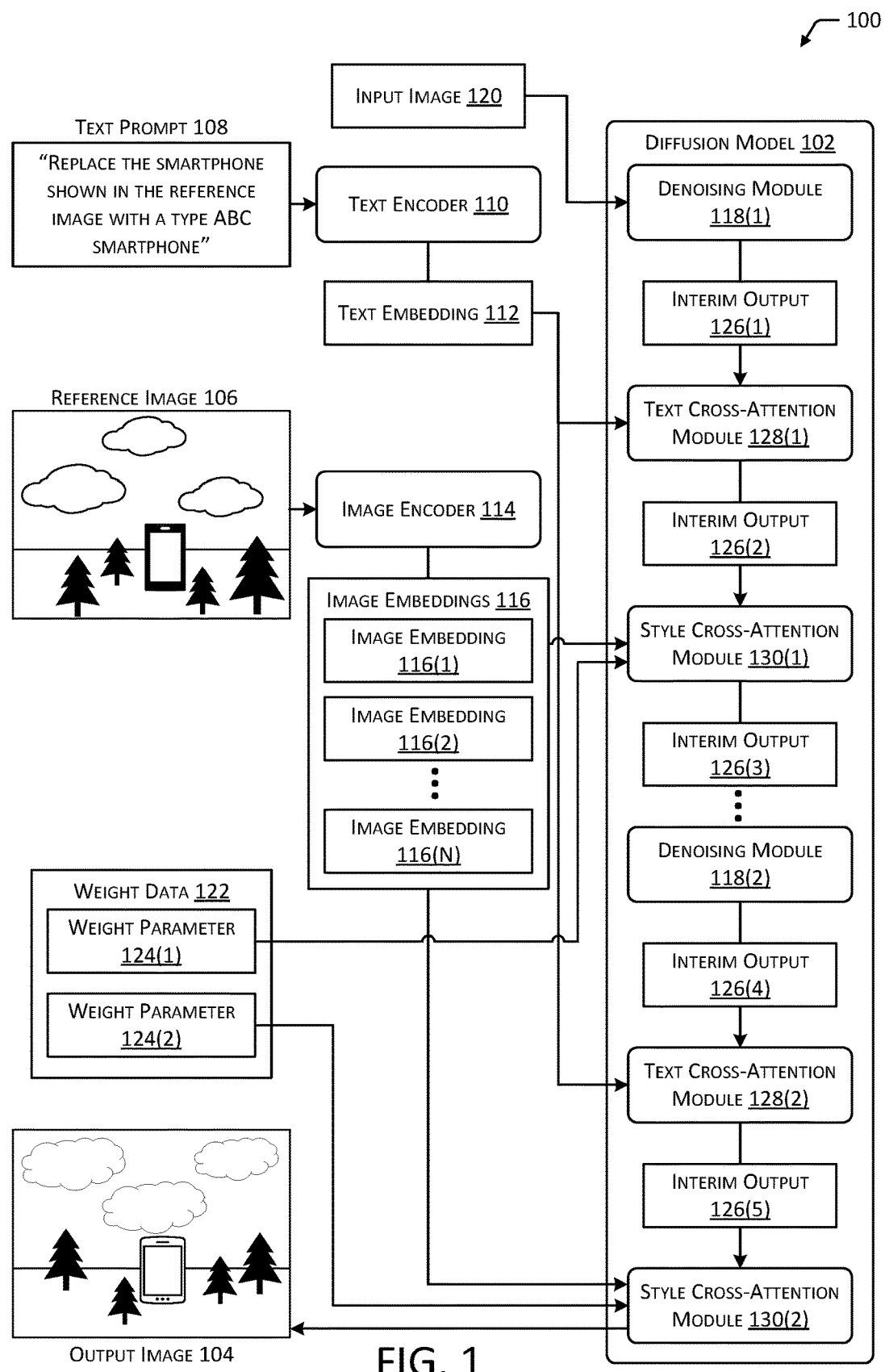
FIG. 1 is a diagram depicting an implementation of a system for using a diffusion model to generate an output image based on separate embeddings associated with a reference image and a text prompt.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Machine learning models may be used to generate images based on various types of inputs. For example, a diffusion model may be trained to generate an image based on text, one or more reference images, or a combination of text and image(s). Continuing the example, text that is descriptive of an object, scene, or other characteristics or content, and a reference image that includes various style elements or other characteristics, may be provided to the diffusion model as inputs, and the diffusion model may generate an image having content that corresponds to the text and style characteristics that correspond to those of the reference image. Diffusion models generate the output image through a denoising process in which an initial image that includes sampled noise is iteratively modified in a series of denoising steps, with each step decreasing the amount of noise in the image to cause characteristics that correspond to the inputs to be generated, until a final output image is generated.

Typically, when providing a reference image and a text prompt to a diffusion model as inputs, a single pooled embedding is generated based on the reference image and text prompt. For example, an image encoder may be used to generate a single image embedding based on the reference image, which may then be aligned with the text using a contrastive loss function. This process may cause detailed information that is included in the reference image to be lost, resulting in the generation of output images that have less fidelity to the style characteristics represented in the reference image. For example, generation of a single embedding based on a reference image and alignment of this embedding with text may cause the diffusion model to disregard fine-grained details that are represented in the reference image while only utilizing high-level semantic information represented in the reference image.

Described in this disclosure are techniques for using a reference image, independently or in combination with a text prompt, to cause a diffusion model or other type of machine learning model to generate an output image having style characteristics similar to those represented in the reference image. Rather than generating a single pooled embedding based on the reference image and aligning this embedding with a text prompt if present, a reference image may be encoded to generate multiple fine-grained embeddings based solely on the reference image. For example, an image encoder may divide an image into multiple non-overlapping regions and use multiple multi-head attention operations to generate embeddings. As another example, a convolutional encoder that reduces spatial resolution may generate flattened outputs based on a reference image, which may be used as embeddings. As yet another example, a combination of convolutional processes interleaved with attention operations may be used to generate image embeddings.

For example, image data that represents one or more reference images may be received or accessed. The reference image(s) may include one or more style characteristics. For example, a style characteristic may include one or more colors, shapes, background elements, contextual elements, and so forth. The image data may be encoded, using one or more image encoders, to generate multiple image embeddings. In some cases, the encoder(s) may be configured to determine a selected number of image embeddings, such as sixteen embeddings. In other implementations, the encoder(s) may determine a quantity of embeddings based on the quantity or characteristics of the reference image(s). In still other implementations, an existing set of embeddings that represent a reference image or one or more style characteristics may be accessed, such as from one or more external data sources or computing devices. Prompt data that includes text describing one or more content characteristics may also be received or accessed. For example, the text may include an instructional prompt that describes content or characteristics for inclusion in an output image. The prompt data may be encoded to generate a text embedding.

The image embeddings and text embedding may be provided as inputs to a diffusion model that is trained to generate output images having characteristics based on image embeddings and text embeddings. For example, the diffusion model may be trained to generate an output image having style characteristics that are identical or similar to style characteristics of the reference image(s) and content characteristics that are identical or similar to those indicated in the prompt data. The diffusion model may include multiple layers, each layer associated with performance of a denoising process, a first cross-attention process based on the text embedding, and a second cross-attention process based on the image embeddings.

For example, an input image that includes sampled noise may be provided to the diffusion model and a denoising process may be performed to generate a first interim output through which a portion of the noise is removed from the image in a manner that causes the first interim output to have characteristics represented by the text embedding and image embeddings. A first cross-attention process may be performed based on the first interim output and the text embedding to generate a second interim output. The cross-attention process may cause prioritization of portions of the first interim output that correspond to the text embedding more heavily than portions of the first interim output that do not correspond to the text embedding. For example, the image represented by the first interim output may have various characteristics that are relevant to the text associated with an item. Portions of the first interim output that are associated with the characteristics represented by the text embedding may therefore strongly correspond to the text embedding, while portions of the first interim output that represent other characteristics or content may not. Use of the first cross-attention process based on the text embedding may determine a second interim output that associates a greater weight with portions of the first interim output that correspond to the text embedding, and a lesser weight with portions of the first interim output that do not correspond to the text embedding.

A second cross-attention process may be performed based on the second interim output, the image embeddings, and a first weight parameter to generate a third interim output. The second cross-attention process may cause prioritization of portions of the second interim output that correspond to the image embeddings more heavily than portions of the second interim output that do not correspond to the image embeddings. For example, the image represented by the second interim output may have various characteristics that are similar to style characteristics represented by the image embeddings, and other characteristics that do not strongly correspond to the image embeddings. Use of the second cross-attention process based on the image embeddings may determine a third interim output that associates a greater weight with portions of the second interim output that correspond to the image embeddings, and a lesser weight with portions of the second interim output that do not correspond to the image embeddings. The first weight parameter may be used to control the extent to which the second cross-attention process affects the correspondence between the style characteristics represented by the image embeddings and the third interim output. For example, the first weight parameter may associate a low weight with the second cross-attention process, which in combination with the denoising process and first cross-attention process, may cause the third interim output to more strongly prioritize characteristics that correspond to the content characteristics represented by the text embedding and less strongly prioritize characteristics that correspond to the style characteristics of the image embeddings.

The first weight parameter may be used for cross-attention processes associated with a first portion of the layers of the diffusion model, such as the first twenty percent, fifty percent, or eighty percent of the layers of the diffusion model. A second weight parameter that associates a higher weight with the second cross-attention process may be used for the second portion of the layers of the diffusion model. For example, during denoising and cross-attention processes associated with earlier layers of the diffusion model, the first weight parameter associated with a low weight may cause the diffusion model to determine outputs that prioritize content characteristics such as the types of objects depicted in an image and the placement of the objects, while associating a lower priority with style characteristics represented by the image embeddings. During denoising and cross-attention processes associated with later layers of the diffusion model, the second weight parameter associated with a higher weight may cause the diffusion model to determine outputs that more strongly prioritize style characteristics represented by the image embeddings. Because the earlier layers of the diffusion model prioritize representing objects and content represented by the text embedding, the later layers of the diffusion model may cause style characteristics represented by the image embeddings to be included in an output image that includes the objects and content indicated in the prompt data.

In some implementations, query data representing a selected set of queries may be used as an input to the diffusion model. For example, the second cross-attention process based on the image embeddings may use the selected set of queries as queries for a cross-attention function, while the image embeddings are used as keys and values for the cross-attention function. Use of a fixed set of queries may enable the diffusion model to utilize reference images having any resolution due to the quantity of image embeddings that are determined based on the quantity of queries in the set.

In some implementations, a reference image may be used to determine the input image that is provided to the initial layer of the diffusion model for performance of a denoising process. The reference image may be encoded to determine a single embedding, such as a pooled embedding, that may be concatenated with the prompt data to determine an embedding that represents the reference image and the text of the prompt data. This image may be provided to the diffusion model as an input, and through the denoising process performed by the diffusion model, an input image that may be used for the process described previously may be generated. In some implementations, edge data associated with the reference image may be determined, such as by using one or more object recognition or edge detection algorithms that determine boundaries between regions of the reference image based on characteristics of the pixels of the reference image. For example, a region of the reference image may be associated with pixels having characteristics within a threshold similarity, such as colors or textures that are identical or similar. The edge data may also be provided to the diffusion model as an input, which may cause the output image determined by the diffusion model to include at least a subset of the boundaries indicated in the edge data. For example, the edge data may cause the output image generated by the diffusion model to include one or more objects or boundaries of the reference image in a corresponding location within the output image.

In some implementations, the diffusion model may be configured to disregard one or more portions of a reference image. For example, the prompt data may include text indicative of a type of object included in the reference image. Continuing the example, the prompt data may include an instructional prompt to remove or disregard objects of that type in the reference image and replace the object(s) with one or more other objects. In such a case, the diffusion model may determine, based on the text embedding, a type of object indicated in the prompt data, and portions of the image embeddings that represent an object that corresponds to that type. During the denoising process, the diffusion model may disregard those portions of the image embeddings, such that the output image generated by the diffusion model does not include the object depicted in the reference image. In other implementations, an indication of a type or other characteristic of an object or portion of the reference image may be provided to the diffusion model independent of the prompt data, and the diffusion model may disregard the portion(s) of the image embeddings that represent that type or characteristic when generating the output image.

In some implementations, one or more components of the diffusion model or image encoder may be trained, while other components may include pre-trained (e.g., frozen) components. For example, the diffusion model may include a first set of parameters associated with performance of a denoising process, a second set of parameters associated with performance of a first cross-attention process based on text embeddings, and a third set of parameters associated with performance of a second cross-attention process based on image embeddings. During training of the diffusion model, modification of the first and second sets of parameters may be prevented while the third parameters may be modified. For example, the denoising processes and cross-attention processes based on text embeddings may be frozen, while the cross-attention processes based on image embeddings may be trainable. In other implementations, modification of parameters associated with the second cross-attention process may be prevented while a set of parameters associated with the image encoder(s) may be trainable. In still other implementations, modification of parameters associated with both the second cross-attention process and the image encoder(s) may be permitted.

Implementations described herein may therefore enable a diffusion model or other type of machine learning model to be provided with a reference image, in addition to or in place of a text prompt, and to generate output images having style characteristics that more closely correspond to those of the reference image. Generation of multiple fine-grained embeddings based on the reference image that are separate from an embedding generated based on a text prompt, rather than a single pooled embedding that is aligned with a text of a prompt using a loss function, enables fine-grained details that are represented in the reference image to be included in output images, rather than only utilizing high-level semantic information included in the reference image. Use of a trainable image encoder and trainable style cross-attention components of a diffusion model, while denoising components and text cross-attention components of the diffusion model may be pre-trained (e.g., frozen) may enable portability of the systems described herein and may reduce the time and computational resources used to train the model to generate output images.

FIG. 1 is a diagram 100 depicting an implementation of a system for using a diffusion model 102 to generate an output image 104 based on separate embeddings associated with a reference image 106 and a text prompt 108. As described previously, a diffusion model 102 may be trained to generate output images 104 based in part on one or more reference images 106. A reference image 106 may include image data that represents one or more style characteristics. Style characteristics may include one or more colors, textures, patterns, shapes, objects, backgrounds, and so forth. For example, the style associated with a particular reference image 106 may be associated with a potentially large number of characteristics, and generation of an instructional prompt that describes these characteristics may be impractical. In such a case, a reference image 106 may be used as an image-based prompt to cause a diffusion model 102 to generate output images 104 having one or more characteristics similar to those of the reference image 106.

The diffusion model 102 may also be trained to generate output images 104 based in part on one or more text prompts 108. For example, prompt data provided to a diffusion model 102 as an input may include text, such as an instructional prompt describing characteristics of an output image 104 to be generated. The diffusion model 102 may be trained to determine output images 104 based on the text of the text prompt 108, as well as semantic information associated with the text prompt 108, such as the proximity of words to other words, use of punctuation, capitalization, and so forth. In some implementations, other types of prompt data may be provided to the diffusion model 102 in addition to or in place of a text prompt 108. For example, audio data may be provided as an input, and the diffusion model 102 or a separate module may use speech to text operations to determine text based on the audio data. In some cases, an encoder may be configured to generate an embedding based on audio data without determining text based on the audio data. Other types of data, such as video data or image data, may be provided in place of or in addition to the text prompt 108. For example, object recognition or image analysis techniques may be used to determine text based on video data or image data that may be provided to the diffusion model 102 as an input.

A text encoder 110 may be used to generate a text embedding 112 based on the text prompt 108. The text embedding 112 may include a vector with one or more dimensions each having a value that represents a characteristic of the text prompt 108. Characteristics of the text prompt 108 may include the presence of various words, characters, groups of words, groups of characters, semantic information, and so forth.

An image encoder 114 may be used to generate multiple image embeddings 116 based on the reference image 106. The image embeddings 116 may each include a vector with one or more dimensions that each have a value representing a characteristic of the reference image 106. Conventionally, when used as an input to a diffusion model 102 a reference image 106 is encoded to generate a single pooled embedding, which is then combined with an embedding representing an input prompt to generate a single input for a diffusion model 102. This process may cause fine-grained details represented in the reference image 106 to be lost in the encoding process, such that the diffusion model 102 is only able to utilize high-level semantic information represented in the reference image 106. However, the image encoder 114 of FIG. 1 may be configured to determine multiple image embeddings 116 based on the reference image 106. For example, FIG. 1 depicts the image embeddings 116 including at least a first image embedding 116(1), a second image embedding 116(2), and any number of additional image embeddings 116(N). In some implementations, the image encoder 114 may be configured to determine a selected number of image embeddings 116, such as sixteen image embeddings 116. In some implementations, the image encoder 114 may determine the image embeddings 116 by dividing the reference image 106 into non-overlapping regions then generating embeddings based on the regions using a multi-head attention process. In other implementations, the image encoder 114 may perform a convolutional process based on the reference image 106 that reduces the spatial resolution thereof. For example, a flattened output of a convolutional process may be used as an image embedding 116 for input to the diffusion model 102. In still other implementations, a combination of convolutional processes interleaved with attention processes may be used to generate a set of image embeddings 116. In addition to generation of multiple fine-grained image embeddings 116, rather than a single pooled embedding based on the reference image 106, the system of FIG. 1 may provide the image embeddings 116 to the diffusion model 102 as a separate input from the text embedding 112, rather than generating a single input-based referenced image 106 and text prompt 108.

A denoising module 118(1) associated with the diffusion model 102 may generate or receive an input image 120 that may be used to determine an output image 104 through an iterative denoising process. For example, the input image 120 may include sampled noise, such as random or Gaussian nose. In other implementations, the input image 120 may be determined based on the reference image 106, as described previously and in FIG. 2. Through multiple denoising steps (sometimes termed "layers" of the diffusion model 102), noise may be removed from the input image 120 in a manner that generates an output image 104 having characteristics based on the inputs provided to the diffusion model 102. For example, the text embedding 112 that represents the text prompt 108, the image embeddings 116 that represent the reference image 106, and weight data 122 indicative of a set of weight parameters 124 may be provided to the diffusion model 102 as inputs.

The denoising module 118(1) may determine an interim output 126(1) based on the input image 120 and one or more other inputs to the diffusion model 102. A text cross-attention module 128(1) associated with the diffusion model 102 may perform a cross-attention operation based on the interim output 126(1) and the text embedding 112. For example, the text cross-attention operation may associate a large weight or priority value, or otherwise prioritize portions of the interim output 126(1) that correspond to the text embedding 112, deprioritize portions of the interim output 126(1) that do not correspond to the text embedding 112, or both prioritize corresponding portions and deprioritize non-corresponding portions of the interim output 126(1). The cross-attention operation may therefore cause subsequent outputs determined using the diffusion model 102 to include characteristics that correspond to the characteristics indicated in the text prompt 108 that are represented by the text embedding 112. For example, FIG. 1 depicts the text cross-attention module 128(1) determining an interim output 126 (2) based on the first interim output 126(1) and the text embedding 112.

A style cross-attention module 130(1) associated with the diffusion model 102 may perform a cross-attention operation based on the interim output 126(2), the image embeddings 116, and a first weight parameter 124(1) of the weight data 122. The style cross-attention operation may associate a large weight or priority value, or otherwise prioritize portions of the interim output 126(2) that correspond to the image embeddings 116, deprioritize portions of the interim output 126(2) that do not correspond to the image embeddings 116, or both prioritize corresponding portions and deprioritize non-corresponding portions of the interim output 126(2). The style cross-attention operation may therefore cause subsequent outputs determined using the diffusion model 102 to include characteristics that correspond to the characteristics include in the reference image 106 that are represented by the image embeddings 116. Generation of multiple fine-grained image embeddings 116, rather than a single pooled embedding or an embedding that is combined with the text embedding 112, may further increase the correspondence between subsequent outputs of the diffusion model 102 and the style characteristics of the reference image 106. The first weight parameter 124(1) may affect the extent to which the style cross-attention process prioritizes the corresponding portions of the interim output 126(2) or deprioritizes the non-corresponding portions. For example, the first weight parameter 124(1) may be used during earlier timesteps of the denoising process performed using the diffusion model 102 and may associate a low weight with the style cross-attention process. Use of a first weight parameter 124(1) associated with a low weight may cause a third interim output 126(3) determined using the style cross-attention process to more strongly prioritize characteristics that correspond to the content characteristics represented by the text embedding 112 and less strongly prioritize characteristics that correspond to the style characteristics of the image embeddings 116. The first weight parameter 124(1) may be used for cross-attention processes associated with a first portion of the layers of the diffusion model 102, such as the first twenty percent, fifty percent, or eighty percent of the layers of the diffusion model 102. The second weight parameter 124(2) may associate a higher weight with the style cross-attention operation and may be used for a second portion of the layers of the diffusion model 102 (e.g., the layers of the diffusion model 102 not associated with the first weight parameter 124(1)). In other implementations, more than two weight parameters 124 may be used, with parameters associated with greater weights being associated with later layers of the diffusion model 102.

While FIG. 1 depicts two example layers of the diffusion model 102, any number of additional layers that each include performance of a denoising process, a cross-attention operation based on the text embedding 112, and a cross-attention operation based on the image embeddings 116 and weight data 122, may be included in the diffusion model 102. As such, while FIG. 1 depicts a denoising module 118(2) associated with the diffusion model 102 subsequent to the third interim output 126(3), the denoising module 118(2) may receive an interim output 126 that has been produced by any number of preceding layers of the diffusion model 102. The denoising module 118(2) may determine a fourth interim output 126(4) based on a preceding interim output 126 and one or more other inputs provided to the diffusion model 102.

A text cross-attention module 128(2) associated with the diffusion model 102 may determine a fifth interim output 126(5) based on the fourth interim output 126(4) and the text embedding 112. The fifth interim output 126(5) may prioritize portions of the fourth interim output 126(4) that correspond to the text embedding 112, deprioritize portions of the fourth interim output 126(4) that do not correspond to the text embedding 112, or both prioritize corresponding portions and deprioritize non-corresponding portions.

A style cross-attention module 130(2) associated with the diffusion model 102 may receive the fifth interim output 126(5), image embeddings 116, and second weight parameter 124(2) as inputs and may represent the final operation performed using the diffusion model 102 and may therefore determine the output image 104. The cross-attention operation performed by the style cross-attention module 130(2) may prioritize portions of the interim output 126(5) that correspond to the image embeddings 116, deprioritize portions of the interim output 126(5) that do not correspond to the image embeddings 116, or both prioritize corresponding portions and deprioritize non-corresponding portions. The second weight parameter 124(2) may be associated with a greater weight or priority than the first weight parameter 124(1) and may therefore cause the process of determining the output image 104 based on the interim output 126(5) to prioritize style characteristics of the reference image 106 rather than prioritizing content characteristics indicated in the text prompt 108. Because the earlier layers of the diffusion model 102 may prioritize representing objects and content represented by the text embedding 112 due the lower weight of the first weight parameter 124(1), the higher weight of the second weight parameter 124(2) may cause later layers of the diffusion model 102 to include style characteristics represented by the image embeddings 116 to be included in an output image 104 that includes the objects and content indicated in the text prompt 108.

Figure 2:
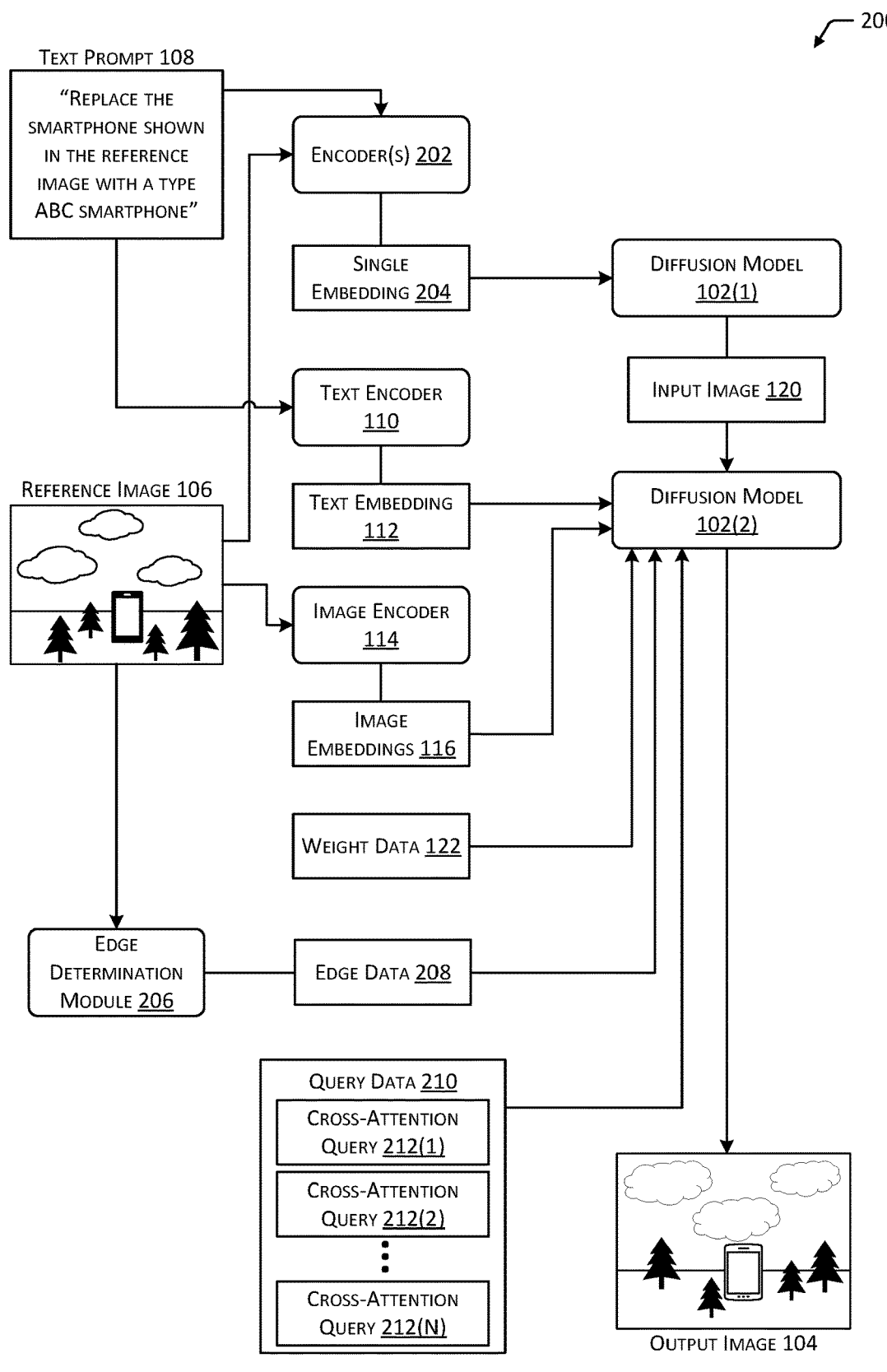
FIG. 2 is a diagram depicting an implementation of a system for generating an input image based on a reference image for use with a diffusion model.

FIG. 2 is a diagram 200 depicting an implementation of a system for generating an input image 120 based on a reference image 106 for use with a diffusion model 102. As described with regard to FIG. 1, a diffusion model 102(2) may generate an output image 104 based on an input image 120 and one or more other inputs, such as a text embedding 112 representing a text prompt 108, a set of image embeddings 116 representing a reference image 106, and weight data 122 including one or more weight parameters 124 that affect the extent to which a cross-attention operation based on the image embeddings 116 affects outputs determined using the diffusion model 102(2). In some cases, the input image 120 may include sampled noise, such as random or Gaussian noise. In other implementations, the input image 120 may be determined based at least in part on the reference image 106.

For example, one or more encoders 202 may generate a single embedding 204 based on the reference image 106 and the text prompt 108. Continuing the example, the encoder(s) 202 may include one or more text encoders that generate a first embedding based on the text prompt 108, and one or more image encoders that generate a second embedding, such as a pooled embedding, based on the reference image 106. The second embedding may be aligned with the first embedding, such as through use of a contrastive loss function, to generate a single embedding 204 to be used as an input to a diffusion model 102(1). While FIG. 2 depicts the single embedding 204 as an input to a first diffusion model 102(1), while the text embedding 112 representing the text prompt 108 and the set of image embeddings 116 representing the reference image 106 are used as inputs to a second diffusion model 102(2), in some implementations, the same diffusion model 102 may be used to determine the input image 120 based on the reference image 106, and to determine the output image 104 based on the input image 120.

The first diffusion model 102(1) may determine an initial output image based on the single embedding 204 that represents the text prompt 108 and reference image 106. The input image 120 may be determined based on the initial output image, such as by adding a quantity of noise to the initial output image.

The second diffusion model 102(2) may determine an output image 104 based on the input image 120, the text embedding 112, the image embeddings 116, and the weight data 122, as described with regard to FIG. 1. For example, the diffusion model 102(2) may perform a series of denoising operations based on the interim output 126 of a previous operation of the diffusion model 102(2), text-based cross-attention operations based on the text embedding 112, and style-based cross-attention operations based on the image embeddings 116 and the weight data 122. As described with regard to FIG. 1, the weight data 122 may include a first weight parameter 124(1) representing a low weight value for the style-based cross-attention process that may cause earlier layers of the diffusion model 102 to prioritize inclusion of content characteristics represented by the text embedding 112 and deprioritize inclusion of style characteristics represented by the image embeddings 116. A second weight parameter 124(2) representing a greater weight value for the style-based cross-attention process may cause later layers of the diffusion model 102 to prioritize inclusion of style characteristics represented by the image embeddings 116.

In some implementations, an edge determination module 206 may determine edge data 208 based on the reference image 106. For example, the edge determination module 206 may include one or more object recognition or edge detection algorithms that determine boundaries between regions of the reference image 106 based on characteristics of the pixels of the reference image 106. For example, a first region of the reference image 106 may be associated with pixels having characteristics within a threshold similarity, such as colors or textures that are identical or similar. The edge data 208 may also be provided to the diffusion model 102 as an input, which may cause the output image 104 determined by the diffusion model 102 to include at least a subset of the boundaries indicated in the edge data 208. For example, the edge data 208 may cause the output image 104 to include one or more objects or boundaries in a corresponding location to the location at which these objects or boundaries are positioned in the reference image 106.

In some implementations, query data 210 may be provided as an input to the diffusion model 102. The query data 210 may include a selected set of cross-attention queries 212 that may be used as queries for the style-based cross-attention operations performed using the diffusion model 102. For example, the cross-attention operation performed by the style cross-attention module 130 may use cross-attention queries 212 represented by the query data 210 as queries, while the image embeddings 116 are used as keys and values. Continuing the example, FIG. 2 depicts the query data 210 including a first cross-attention query 212(1), a second cross-attention query 212(2), and any number of additional cross-attention queries 212(N). In one implementation, the query data 210 may include sixteen cross-attention queries. Use of a fixed set of cross-attention queries 212 may enable the diffusion model 102 to utilize reference images 106 having any resolution due to the quantity of image embeddings 116 that are determined being based on the quantity of cross-attention queries 212.

FIGS. 3A and 3B are a flow diagram 300 depicting an implementation of a method for using a diffusion model 102 to generate an output image 104 based on embeddings associated with a reference image 106 and a text prompt 108. As shown in FIG. 3A, at 302, a diffusion model 102 may be trained to generate output images 104 having characteristics based on image embeddings 116 by permitting modifications of parameters associated with a style-based cross-attention operation associated with the model. For example, the diffusion model 102 may include a first set of parameters associated with denoising processes performed by the model, a second set of parameters associated with text-based cross-attention operations performed by the model, and a third set of parameters associated with style-based cross-attention operations performed by the model. In some implementations, one or more portions the diffusion model 102 may be pre-trained. For example, modification of the first and second sets of parameters may be prevented (e.g., the parameters may be frozen), while modification of the third set of parameters associated with the style-based cross-attention operation may be permitted during the training process. In other implementations, the parameters associated with the style-based cross-attention operation may be prevented from modification and the step indicated at 302 may be omitted.

At 304, an image encoder 114 may be trained to generate a set of image embeddings 116 based on image data, such as a reference image 106. For example, the image encoder 114 may be associated with a set of parameters that are separate from the parameters of the diffusion model 102. In some implementations, the parameters associated with the image encoder 114 may be modified during the training process while the parameters associated with the diffusion model 102 are prevented from modification. In other implementations, the parameters associated with the image encoder 114 may be modified during the training process and one or more sets of parameters, such as parameters associated with the style-based cross-attention operation performed by the diffusion model 102, may also be modified using a training process. In still other implementations, a pre-trained image encoder 114 may be used, or modification of parameters associated with the image encoder 114 may be prevented, and the step indicated at 304 may be omitted.

At 306, a mapping between outputs of an image encoder 114 and inputs to a style-based cross-attention operation of a diffusion model 102 may be trained. For example, the diffusion model 102 and image encoder 114 may be pre-trained (e.g., frozen), while parameters associated with a linear mapping between the image embeddings 116 and the inputs to the style-based cross-attention operation are modified during the training process. In other implementations, the diffusion model 102, the image encoder 114, or both the diffusion model 102 and image encoder 114 may be trained in addition to or in place of the linear mapping. In still other implementations, the linear mapping may not be trained and the step indicated at 306 may be omitted.

At 308, first image data that represents a reference image 106 having style characteristics may be received. For example, a reference image 106 may depict one or more objects, colors, backgrounds, shapes, patterns, textures, and so forth. The reference image 106 may be used as an image-based instructional prompt to cause the diffusion model 102 to generate output images 104 having characteristics similar to those of the reference image 106.

At 310, the reference image 106 may be encoded using an image encoder 114 to determine a set of image embeddings 116. An image embedding 116 may include a vector having one or more dimensions that each represent a value associated with one or more characteristics of the reference image 106. The image encoder 114 may be configured to determine multiple image embeddings 116 based on the reference image 106, rather than a single embedding 204. In some implementations, the image encoder 114 may determine the image embeddings 116 by dividing the reference image 106 into regions then generating embeddings based on the regions using one or more attention operations. In other implementations, the image encoder 114 may perform a convolutional process based on the reference image 106, and a flattened output of the convolutional process may be used as an image embedding 116. In still other implementations, a combination of convolutional processes interleaved with attention processes may be used to generate a set of image embeddings 116.

At 312, prompt data that includes a text prompt 108 indicative of content characteristics may be received. For example, a text prompt 108 may include an instructional prompt describing characteristics of an output image 104 to be generated. In some implementations, the prompt data may include one or more other types of data in addition to or in place of text, such as audio data, video data, or image data, and one or more processes, such as a speech-to-text process, may be used to determine text based on the other data.

At 314, the prompt data may be encoded to determine a text embedding 112. The text embedding 112 may include a vector with one or more dimensions, each having a value that represents a characteristic of the text prompt 108. Characteristics of the text prompt 108 may include the presence of various words, characters, groups of words, groups of characters, semantic information, and so forth.

At 316, the image embeddings 116, text embedding 112, and weight data 122 that includes a set of weight parameters 124 may be provided as inputs to a diffusion model 102. As described with regard to FIG. 1, an input image 120 may also be provided as an input. In some implementations, the input image 120 may include random, sampled, or Gaussian noise. In other implementations, as described with regard to FIG. 2, the reference image 106 may be used to generate the input image 120 by determining a single embedding 204 based on the reference image 106 and text prompt 108, which may be used as an input to a diffusion model 102 to generate an initial output image. The input image 120 may be determined based on the initial output image such as by adding a quantity of noise to the initial output image.

As shown in FIG. 3B, at 318, the diffusion model 102 may be used to perform a first denoising process based on the previous inputs. For example, based on an input image 120 or an interim output 126 from a previous process, a denoising process may include iteratively removing noise from an image to generate a subsequent output. The manner in which noise is removed to cause the subsequent output to represent an image having particular characteristics may be determined based on the embeddings provided to the diffusion model 102 as inputs.

At 320, the diffusion model 102 may be used to perform a first text-based cross-attention operation based on the output from the previous denoising process and the text embedding 112. The text cross-attention operation may associate a large weight or priority value, or otherwise prioritize portions of the output from the previous denoising operation that correspond to the text embedding 112, deprioritize portions that do not correspond to the text embedding 112, or both prioritize corresponding portions and deprioritize non-corresponding portions of the previous output. The text-based cross-attention operation may cause subsequent outputs determined using the diffusion model 102 to include characteristics that correspond to the content characteristics indicated in the text prompt 108 represented by the text embedding 112.

At 322, the diffusion model 102 may be used to perform a first style-based cross-attention operation based on the output from the previous text-based cross-attention operation, the image embeddings 116, and a first weight parameter 124(1) representing a low weight. The style cross-attention operation may associate a large weight or priority value, or otherwise prioritize portions of the previous output that correspond to the image embeddings 116, deprioritize portions that do not correspond to the image embeddings 116, or both prioritize corresponding portions and deprioritize non-corresponding portions of the previous output. The style cross-attention operation may cause subsequent outputs determined using the diffusion model 102 to include characteristics that correspond to the style characteristics included in the reference image 106 represented by the image embeddings 116. The first weight parameter 124(1) may affect the extent to which the style characteristics are prioritized in subsequent outputs. For example, the first weight parameter 124(1) may be used during earlier layers of the diffusion model 102 and may associate a low weight with the style cross-attention process. Use of a first weight parameter 124(1) associated with a low weight may cause outputs associated with earlier layers of the diffusion model 102 to more strongly prioritize the content characteristics represented by the text embedding 112 and less strongly prioritize characteristics the style characteristics represented by the image embeddings 116.

The steps represented at 318, 320, and 322 may be associated with a first portion of the layers of the diffusion model 102 (e.g., early layers of the diffusion model 102), such as the first twenty percent, fifty percent, or eighty percent of the layers of the diffusion model 102. For example, the steps indicated at 318, 320, and 322 may be repeated for multiple layers of the diffusion model 102 until each process associated with the first portion of the layers has been completed.

The steps represented at 324, 326, and 328 may be associated with a second portion of the layers of the diffusion model 102 (e.g., later layers of the diffusion model 102). At 324, the diffusion model 102 may be used to perform a second denoising process based on the previous inputs. For example, based on an interim output 126 from a previous process, the denoising process may remove noise from an image represented by the interim output 126 to generate a subsequent output. The manner in which noise is removed may be determined based on the embeddings and other inputs provided to the diffusion model 102.

At 326, the diffusion model 102 may be used to perform a second text-based cross-attention process based on the output from the previous denoising process and the text embedding 112. The text cross-attention operation may prioritize portions of the output from the previous denoising operation that correspond to the text embedding 112, deprioritize portions do not correspond to the text embedding 112, or both prioritize corresponding portions and deprioritize non-corresponding portions of the previous output. The text-based cross-attention operation may cause subsequent outputs to include characteristics that correspond to the content characteristics indicated in the text prompt 108.

At 328, the diffusion model 102 may be used to perform a second style-based cross-attention process based on the output from the previous text-based cross-attention process, the image embeddings 116 and a second weight parameter 124(2) representing a high weight. The style cross-attention operation may prioritize portions of the previous output that correspond to the image embeddings 116, deprioritize portions that do not correspond to the image embeddings 116, or both prioritize corresponding portions and deprioritize non-corresponding portions of the previous output. The style cross-attention operation may cause subsequent outputs to include characteristics that correspond to the style characteristics included in the reference image 106. The second weight parameter 124(2) may affect the extent to which the style characteristics are prioritized in subsequent outputs. For example, the second weight parameter 124(2) may be used during later layers of the diffusion model 102 and may associate a high weight with the style cross-attention process. Use of a second weight parameter 124(2) associated with a high weight may cause outputs associated with later layers of the diffusion model 102 to more strongly prioritize the style characteristics represented by the image embeddings 116. Use of the second weight parameter 124(2) after use of the first weight parameter 124(1) representing a lower weight for earlier layers of the diffusion model 102 may cause style characteristics represented by the image embeddings 116 to be added to an interim output 126 that includes characteristics represented in the text prompt 108.

As described previously, the steps represented at 324, 326, and 328 may be associated with a second portion of the layers of the diffusion model 102 (e.g., later layers of the diffusion model 102). For example, the steps indicated at 324, 326, and 328 may be repeated for multiple layers of the diffusion model 102 until each process associated with the second portion of the layers has been completed.

At 330, the diffusion model 102 may generate a final output image 104 based on the output from the previous operation. For example, as described with regard to FIG. 1, after performing the style-based cross-attention operation associated with the final layer of the diffusion model 102, the output associated with this operation may be used as a final output image 104. In other implementations, one or more additional denoising or cross-attention operations may be used to determine the output image 104 based on the output from the final style-based cross-attention process.

Figure 4:
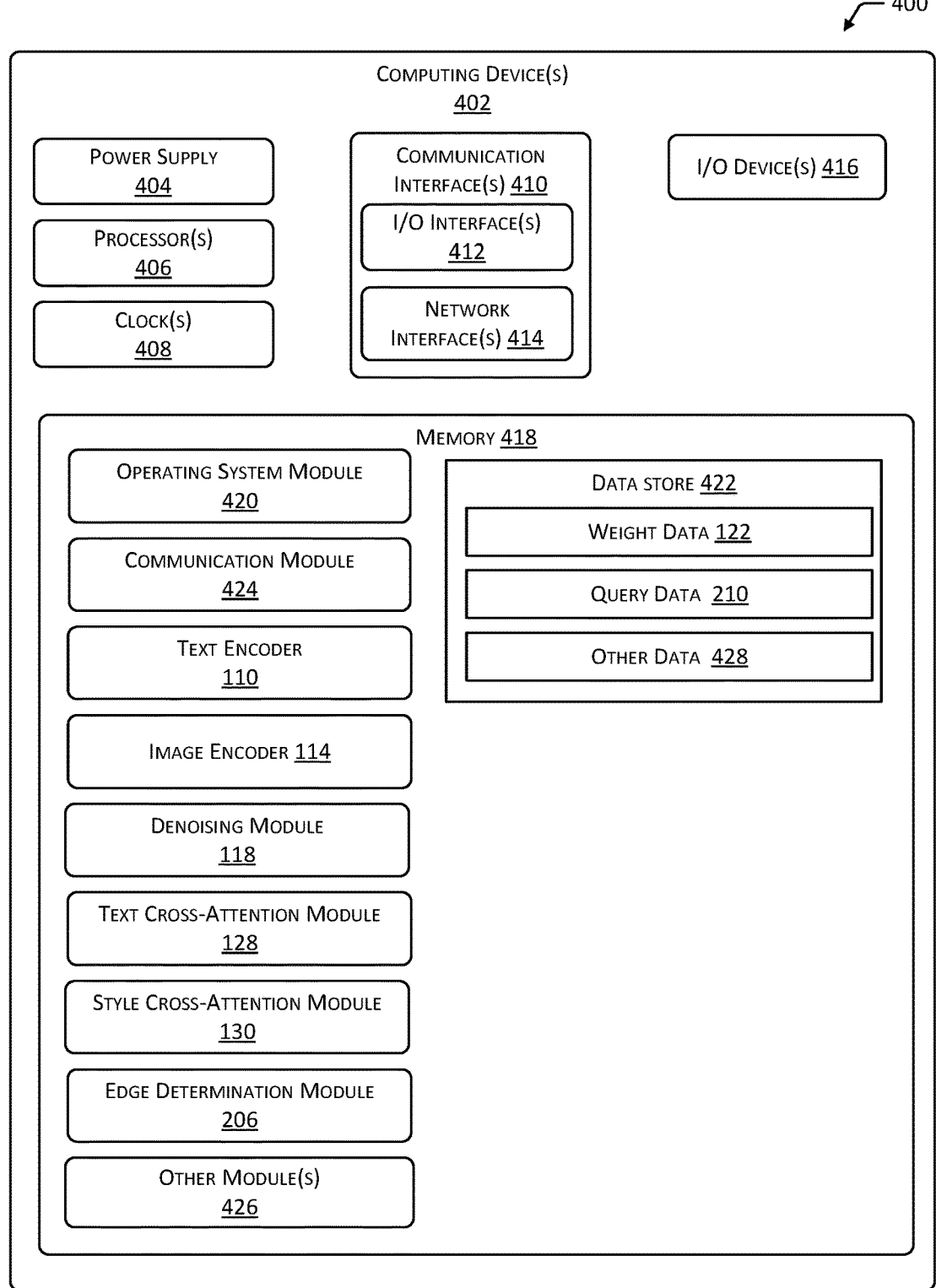
FIG. 4 is a block diagram depicting an implementation of a computing device within the present disclosure.

FIG. 4 is a block diagram 400 depicting an implementation of a computing device 402 within the present disclosure. The computing device 402 may include one or multiple computing devices that store data and control operations of the system shown in FIGS. 1 and 2. For example, one or more computing devices 402 may store components of one or more diffusion models 102 or other machine learning models, encoders, modules for training machine learning models, receiving user input, generating output, and so forth. Thus, while FIG. 4 depicts a single block diagram 400, the computing device 402 may include any number and any type of computing devices including, without limitation, one or more servers, personal computing devices, portable computing devices, network-accessible data storage devices, and so forth.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LAN (WLANs), wide area networks (WANs), wireless WANs, and so forth. For example, the network interfaces 414 may include devices compatible with Ethernet, Wi-Fi, Bluetooth, ZigBee, Z-Wave, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may additionally store one or more text encoders 110. The text encoder(s) 110 may be used to determine one or more text embeddings 112 based on text data. A text embedding 112 may include a vector or other type of representation of one or more values that represent the presence of one or more words, characters, groups of words, groups of characters, and semantic information associated with text data. Semantic information may include the proximity of words or characters to other words or characters, use of punctuation, capitalization, and so forth.

The memory 418 may store one or more image encoders 114. The image encoder(s) 114 may be used to determine one or more sets of image embeddings 116 based on image data, such as a reference image 106. An image embedding 116 may include a vector or other type of representation of one or more values that represent style characteristics of an image, such as the locations of pixels or groups of pixels that represent one or more colors, patterns, textures, shapes, objects, and so forth. In some implementations, an image encoder 114 may divide an image into multiple non-overlapping regions and use multiple multi-head attention operations to generate embeddings. As another example, an image encoder 114 may perform a convolutional process that reduces spatial resolution to generate flattened outputs which may be used as inputs to a diffusion model 102. As yet another example, an image encoder 114 may perform a combination of convolutional processes interleaved with attention operations to generate image embeddings 116.

The memory 418 may also store the denoising module 118. The denoising module 118 may perform a denoising process associated with a diffusion model 102 to remove noise from an image, through an iterative process, to determine an output image 104. The manner in which noise is removed may be affected by inputs provided to the diffusion model 102, such as text embeddings 112 and image embeddings 116. Therefore, through multiple denoising steps (sometimes termed "layers" of the diffusion model 102), noise may be removed from the input image 120 in a manner that generates an output image 104 having characteristics based on the inputs provided to the diffusion model 102.

The memory 418 may additionally store the text cross-attention module 128. The text cross-attention module 128 may perform a cross-attention operation based on an input from a previous operation of the diffusion model 102 and a text embedding 112. A text cross-attention operation may prioritize portions of an input that correspond to the text embedding 112, deprioritize portions that do not correspond to the text embedding 112, or both prioritize corresponding portions and deprioritize non-corresponding portions. Performance of the cross-attention operation may cause subsequent outputs determined using the diffusion model 102 to include characteristics that correspond to the characteristics represented by the text embedding 112.

The memory 418 may store the style cross-attention module 130. The style cross-attention module 130 may prioritize portions of an output from a previous process that correspond to a set of image embeddings 116, deprioritize portions that do not correspond to the image embeddings 116, or both prioritize corresponding portions and deprioritize non-corresponding portions. Performance of the style cross-attention operation may cause subsequent outputs determined using the diffusion model 102 to include characteristics that correspond to the style characteristics represented by the image embeddings 116. Generation of multiple fine-grained image embeddings 116, rather than a single pooled embedding or an embedding that is combined with the text embedding 112, may further increase the correspondence between outputs of the diffusion model 102 and the style characteristics of the reference image 106. The style cross-attention module 130 may use weight parameters 124 represented by weight data 122 to determine the extent to which the style cross-attention process prioritizes the corresponding portions of an input or deprioritizes non-corresponding portions. For example, a weight parameter 124 representing a lower weight may be used during earlier layers of the diffusion model 102 to cause the diffusion model 102 to more strongly prioritize content characteristics represented by the text embedding 112 and less strongly prioritize the style characteristics represented by the image embeddings 116. A weight parameter 124 representing a higher weight may be used during later layers of the diffusion model 102 to cause the diffusion model 102 to prioritize style characteristics represented by the image embeddings 116. In other implementations, more than two weight parameters 124 may be used, with parameters associated with greater weights being associated with later layers of the diffusion model 102. In some implementations, the style cross-attention module 130 may determine an output based in part on query data 210. Query data 210 may represent a set of cross-attention queries 212 that may be used as queries for style-based cross-attention operations, while image embeddings 116 are used as keys and values. Use of a fixed set of cross-attention queries 212 may enable the diffusion model 102 to utilize reference images 106 having any resolution due to the quantity of image embeddings 116 that are determined being based on the quantity of cross-attention queries 212.

The memory 418 may also store the edge determination module 206. The edge determination module 206 may determine edge data 208 based on one or more images. For example, the edge determination module 206 may include one or more object recognition or edge detection algorithms that determine boundaries between regions of an image based on characteristics of the pixels of the image, such as colors or textures that are identical or similar. The edge data 208 may be provided to the diffusion model 102 as an input, which may cause the output image 104 determined by the diffusion model 102 to include at least a subset of the boundaries indicated in the edge data 208.

Other modules 426 may also be present in the memory 418. For example, other modules 426 may include permission or authorization modules for modifying data associated with the computing device 402. Other modules 426 may also include encryption modules to encrypt and decrypt communications between computing devices 402, authentication modules to authenticate communications sent or received by computing devices 402, and so forth. Other modules 426 may include modules for training the diffusion model 102, image encoder 114, text encoder 110, or other machine learning models or encoders. Other modules 426 may also include modules for analyzing or processing text data, for generating text data based on audio data, video data, image data, or other types of data, and so forth. Other modules 426 may include user interface modules for receiving user input, such as reference images 106, text prompts 108, and so forth, and providing output such as output images 104 via one or more user interfaces. Other modules 426 may include text recognition and object recognition modules, such as modules that may determine a particular type of object indicated in a text prompt 108 and a location within a reference image 106 that includes the particular type of object. For example, a diffusion model 102 may disregard portions of the image embeddings 116 that represent the particular type of object, such as when generating an output image 104 that replaces the object depicted in the reference image 106 with a different object.

Other data 428 within the data store(s) 422 may include configurations, settings, preferences, and default or threshold values associated with computing devices 402, style or layout data for generation of interfaces, and so forth. Other data 428 may include training data for training the diffusion model 102, encoders, and other machine learning models. Other data 428 may also include encryption keys and schema, access credentials, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations.

Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:

one or more non-transitory memories storing computer-executable instructions; and one or more hardware processors to execute the computer-executable instructions to:

provide a plurality of image embeddings, a first weight parameter, and a second weight parameter as inputs to a diffusion model that is trained to determine output images having characteristics based on image embeddings, wherein the diffusion model generates an output image by:

performing a first denoising process based on an input image to generate a first interim output;

performing a first cross-attention process based on the plurality of image embeddings, the first weight parameter, and the first interim output to generate a second interim output, wherein the first weight parameter is used to control a first correspondence between the second interim output and one or more style characteristics represented by the plurality of image embeddings;

performing a second denoising process based on the second interim output to generate a third interim output; and performing a second cross-attention process based on the plurality of image embeddings, the second weight parameter, and the third interim output to generate a fourth interim output, wherein the second weight parameter is used to control a second correspondence between the one or more style characteristics and the fourth interim output, and wherein the second correspondence is greater than the first correspondence;

wherein the output image is determined based at least in part on the fourth interim output, and wherein the diffusion model further generates the output image by:

determining input indicative of a type of object;

determining a portion of the plurality of image embeddings that represents an object that corresponds to the type of object; and disregarding the portion of the plurality of image embeddings that represents the type of object during one or more of the first denoising process, the second denoising process, the first cross-attention process, or the second cross-attention process.

2. The system of claim 1, further comprising computer-executable instructions to:

determine first image data that represents an image having the one or more style characteristics;

encode the first image data using an image encoder to generate the plurality of image embeddings; and generate the input image by:

determining a single embedding based on the first image data; and providing the single embedding as an input to the diffusion model, wherein the diffusion model performs a third denoising process based on the single embedding to generate the input image.

3. The system of claim 2, further comprising computer-executable instructions to:

determine edge data based on characteristics of pixels of the input image, wherein the edge data is indicative of one or more boundaries between at least a first region of the input image having a first characteristic and a second region of the input image having a second characteristic; and provide the edge data as an input to the diffusion model for generation of the output image, wherein the output image includes at least a subset of the one or more boundaries.

4. The system of claim 1, further comprising computer-executable instructions to:

receive first text data indicative of one or more content characteristics;

encode the first text data to generate a text embedding; and provide the text embedding as an input to the diffusion model, wherein the diffusion model further generates the output image by:

performing a third cross-attention process based on the text embedding and the first interim output to generate a fifth interim output, wherein the first cross-attention process determines the second interim output based on the fifth interim output; and performing a fourth cross-attention process based on the text embedding and the third interim output to generate a sixth interim output, wherein the second cross-attention process determines the fourth interim output based on the sixth interim output.

5. The system of claim 4, wherein the diffusion model further generates the output image by:

determining the input indicative of the type of object based on the text embedding, wherein the type of object is indicated in the first text data.

6. The system of claim 4, wherein the diffusion model comprises first parameters associated with the first denoising process and the second denoising process, second parameters associated with the first cross-attention process and the second cross-attention process, and third parameters associated with the third cross-attention process and the fourth cross-attention process, the system further comprising computer-executable instructions to:

train the diffusion model to generate output images having characteristics based on image embeddings by:

preventing modification of the first parameters and the third parameters; and permitting modification of the second parameters.

7. The system of claim 4, further comprising computer-executable instructions to:

determine first image data that represents an image having the one or more style characteristics;

encode the first image data using an image encoder to generate the plurality of image embeddings;

wherein:

the diffusion model comprises first parameters associated with the first denoising process and the second denoising process, second parameters associated with the first cross-attention process and the second cross-attention process, and third parameters associated with the third cross-attention process and the fourth cross-attention process, and the image encoder comprises fourth parameters associated with generation of image embeddings based on image data; and train the image encoder to generate image embeddings based on image data by:
  preventing modification of the first parameters, the second parameters, and the third parameters; and
  permitting modification of the fourth parameters.

8. The system of claim 1, further comprising computer-executable instructions to:
  provide query data comprising a plurality of queries as an input to the diffusion model, wherein the first cross-attention process uses at least a first subset of the plurality of queries to determine the second interim output, and the second cross-attention process uses at least a second subset of the plurality of queries to determine the fourth interim output.

9. A system comprising:
  one or more non-transitory memories storing computer-executable instructions; and
  one or more hardware processors to execute the computer-executable instructions to:
    provide an input image, a plurality of image embeddings, a first weight parameter, and a second weight parameter as inputs to a first machine learning model that is trained to determine output images having characteristics based on image embeddings, wherein the first machine learning model:
    performs a first denoising process based on the input image to generate a third output;
    performs a first cross-attention process based on the plurality of image embeddings and the first weight parameter, wherein a first correspondence between the plurality of image embeddings and a first output of the first cross-attention process is based at least in part on the first weight parameter and the third output;
    performs a second denoising process on the first output to generate a fourth output;
    performs a second cross-attention process based on the plurality of image embeddings, the first output, and the second weight parameter, wherein a second correspondence between the plurality of image embeddings and a second output of the second cross-attention process is based at least in part on the second weight parameter and the fourth output, and wherein the second correspondence is greater than the first correspondence; and
    determines an output image based at least in part on the second output.

10. The system of claim 9, further comprising computer-executable instructions to:
  determine a text embedding based on first text data; and
  provide the text embedding as an input to the first machine learning model, wherein the first machine learning model further:
    performs a third cross-attention process based on the text embedding and the third output to generate a fifth output, wherein the first cross-attention process determines the first output further based on the fifth output; and
    performs a fourth cross-attention process based on the text embedding and the fourth output to generate a sixth output, wherein the second cross-attention process determines the second output further based on the sixth output.

11. The system of claim 10, wherein the first machine learning model further:
  determines, based on the text embedding, a first characteristic of an object indicated in the first text data; and determines a portion of the plurality of image embeddings associated with one or more second characteristics that correspond to the first characteristic;
  wherein the first output and the second output are determined independent of the portion of the plurality of image embeddings.

12. The system of claim 9, wherein the plurality of image embeddings is determined based on first image data, the system further comprising computer-executable instructions to:
  generate the input image by:
    determining a single embedding based on the first image data; and
    providing the single embedding as an input to one of the first machine learning model or a second machine learning model, wherein the one of the first machine learning model or the second machine learning model performs a denoising process based on the single embedding to generate the input image.

13. The system of claim 12, further comprising computer-executable instructions to:
  determine edge data based on the input image, wherein the edge data is indicative of one or more boundaries between at least a first region of the input image having a first characteristic and a second region of the input image having a second characteristic; and
  provide the edge data as an input to the first machine learning model, wherein the output image includes at least a subset of the one or more boundaries.

14. The system of claim 9, further comprising computer-executable instructions to:
  provide input indicative of a first characteristic of an object to the first machine learning model, wherein:
    the first machine learning model further determines, based on the plurality of image embeddings, a portion of the plurality of image embeddings associated with one or more second characteristics that correspond to the first characteristic; and
    the first output and the second output are determined independent of the portion of the plurality of image embeddings.

15. The system of claim 9, further comprising computer-executable instructions to:
  provide query data comprising a plurality of queries as an input to the first machine learning model, wherein the first cross-attention process uses at least a first subset of the plurality of queries to determine the first output, and the second cross-attention process uses at least a second subset of the plurality of queries to determine the second output.

16. A system comprising:
  one or more non-transitory memories storing computer-executable instructions; and
  one or more hardware processors to execute the computer-executable instructions to:
    determine a single embedding based on first image data;
    provide the single embedding as an input to a first machine learning model, wherein the first machine learning model performs a denoising process based on the single embedding to generate an input image; and
    provide the input image, a plurality of image embeddings, a first weight parameter, and a second weight parameter as inputs to one or more of the first machine learning model or a second machine learning model, wherein the one or more of the first machine learning model or the second machine learning model is trained to determine output images having characteristics based on image embeddings, and wherein the one or more of the first machine learning model or the second machine learning model:

performs a first cross-attention process based on the plurality of image embeddings and the first weight parameter, wherein a first correspondence between the plurality of image embeddings and a first output of the first cross-attention process is based at least in part on the first weight parameter;

performs a second cross-attention process based on the plurality of image embeddings, the first output, and the second weight parameter, wherein a second correspondence between the plurality of image embeddings and a second output of the second cross-attention process is based at least in part on the second weight parameter, and wherein the second correspondence is greater than the first correspondence; and determines an output image based at least in part on the second output.

17. The system of claim 16, further comprising computer-executable instructions to:

provide input indicative of a first characteristic of an object to the one or more of the first machine learning model or the second machine learning model, wherein:

the one or more of the first machine learning model or the second machine learning model further determines, based on the plurality of image embeddings, a portion of the plurality of image embeddings associated with one or more second characteristics that correspond to the first characteristic; and the first output and the second output are determined independent of the portion of the plurality of image embeddings.

18. The system of claim 16, wherein the one or more of the first machine learning model or the second machine learning model further:

performs a first denoising process based on the input image to generate a third output, wherein the first cross-attention process determines the first output further based at least in part on the third output; and performs a second denoising process based on the first output to generate a fourth output, wherein the second cross-attention process determines the second output based at least in part on the fourth output.

19. The system of claim 18, further comprising computer-executable instructions to:

determine a text embedding based on first text data; and provide the text embedding as an input to the one or more of the first machine learning model or the second machine learning model, wherein the one or more of the first machine learning model or the second machine learning model further:

performs a third cross-attention process based on the text embedding and the third output to generate a fifth output, wherein the first cross-attention process determines the first output further based on the fifth output;

performs a fourth cross-attention process based on the text embedding and the fourth output to generate a sixth output, wherein the second cross-attention process determines the second output further based on the sixth output;

determines, based on the text embedding, a first characteristic of an object indicated in the first text data; and determines a portion of the plurality of image embeddings associated with one or more second characteristics that correspond to the first characteristic;

wherein the first output and the second output are determined independent of the portion of the plurality of image embeddings.

20. The system of claim 16, further comprising computer-executable instructions to:

determine edge data based on the input image, wherein the edge data is indicative of one or more boundaries between at least a first region of the input image having a first characteristic and a second region of the input image having a second characteristic; and provide the edge data as an input to the one or more of the first machine learning model or the second machine learning model, wherein the output image includes at least a subset of the one or more boundaries.

* * * * *